Jan. 29, 1963  J. H. HOLDHAM  3,075,779
SHAFT SEALING UNIT
Filed Aug. 15, 1960  5 Sheets-Sheet 1

INVENTOR
John H. Holdham.

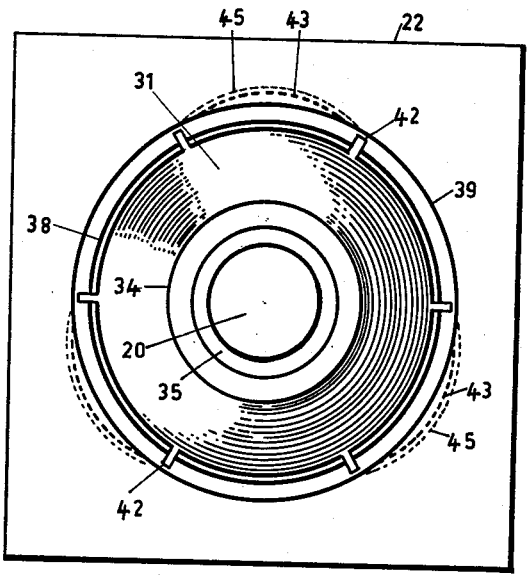
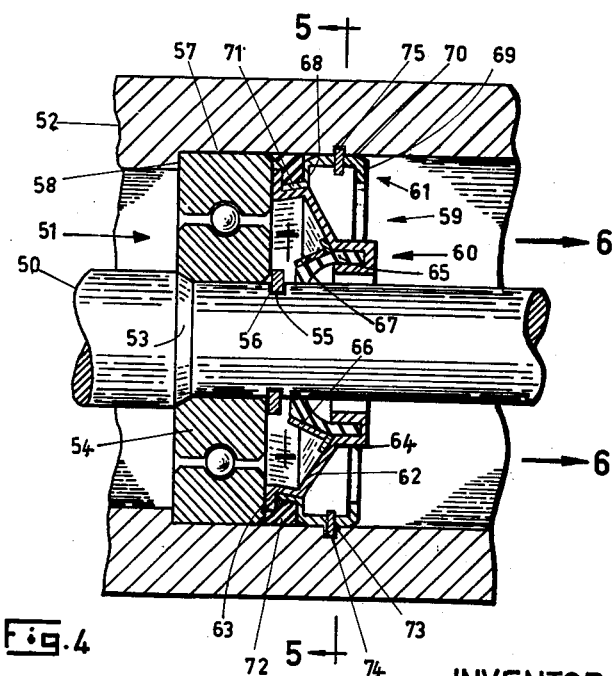

Jan. 29, 1963  J. H. HOLDHAM  3,075,779
SHAFT SEALING UNIT
Filed Aug. 15, 1960  5 Sheets-Sheet 4

INVENTOR
John H. Holdham.

Jan. 29, 1963   J. H. HOLDHAM   3,075,779
SHAFT SEALING UNIT
Filed Aug. 15, 1960   5 Sheets-Sheet 5
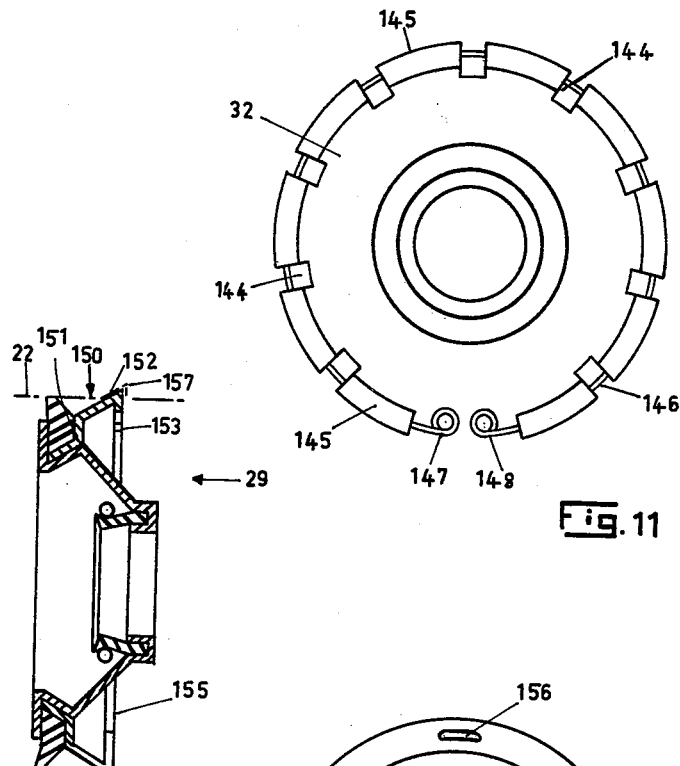
Fig. 11
Fig. 12
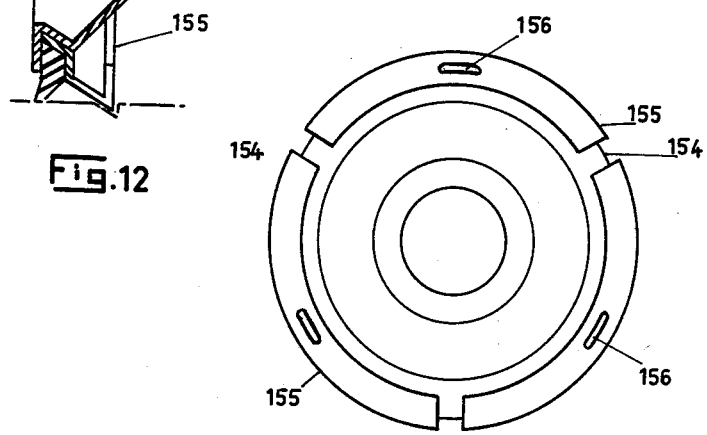
Fig. 13
INVENTOR,
John H. Holdham.

United States Patent Office 3,075,779
Patented Jan. 29, 1963

3,075,779
SHAFT SEALING UNIT
John H. Holdham, Brampton, Ontario, Canada (% Canadian Research and Development Foundation, 1434 Queen St. W., Toronto 3, Ontario, Canada)
Filed Aug. 15, 1960, Ser. No. 49,601
8 Claims. (Cl. 277—37)

This invention relates to improvements in grease and dirt seals and more particularly to improvements in sealing means for shafts and bearings.

It is conventional practice to utilize a shaft seal consisting of a cylindrical metal container from the bore of which protrudes a sealing element designed to fit around the shaft, the outer walls being a close fit in the bore of the bearing housing, this conventional system having the disadvantages that the fit of the metal container in the bearing housing must be machined to a very close tolerance in order to prevent leakage. A further disadvantage of this system is that in many instances seals of this type become irreparably damaged upon removal.

Another conventional method is to utilize a seal similar to that previously described, but differing in that this second method utilizes a face plate used as a retainer, this face plate being screwed or bolted into the bearing housing. This method necessitates a second seal in the form of a gasket between the bearing plate and the bearing housing.

It is an object of this invention to provide a sealing means for shafts and bearings, in the following called a shaft sealing unit, which will maintain a positive seal for both the shaft and the bearing of sufficient flexibility to allow for discrepancies in machining and other minor malalignments.

Another object of this invention is to provide a shaft sealing unit which may be removed and replaced subsequent to its initial fitting without damaging it or detracting from its sealing qualites.

It is a further object of this invention to provide a shaft sealing unit comprising few parts, none of which are required to be removed from the main unit during normal installation or removal of the seal.

It is another object of this invention to provide a shaft sealing unit which will positively locate and retain the shaft bearing within the bearing housing.

Yet another object of this invention is to provide a shaft sealing unit which may be quickly and easily installed or removed with little or no danger of damaging the seals.

It is a further object of this invention to provide a shaft sealing unit which is secured within a bearing housing without the use of screws and the like.

Another object of this invention is to provide a shaft sealing unit having alternative methods of retaining the seals, attaching the seals to their respective housings, and of locking the units within the bore of the bearing housing, which may be adapted to suit various types of installations.

These and other objects and features of this invention will become apparent when taken in conjunction with the accompanying drawings in which:

FIG. 3 is an end elevation of the shaft sealing unit as illustrated in FIGS. 1 and 2.

FIG. 4 is a mid-vertical, sectional, side elevation of a shaft sealing unit showing one alternative.

FIG. 11 is an end elevation of the shaft sealing unit as shown in FIG. 10.

FIG. 12 is a mid-vertical, sectional side elevation of a shaft sealing unit illustrating another alternative method of locking the unit in the shaft bearing housing.

FIG. 13 is an end elevation of the shaft sealing unit as shown in FIG. 12.

Figure 1:
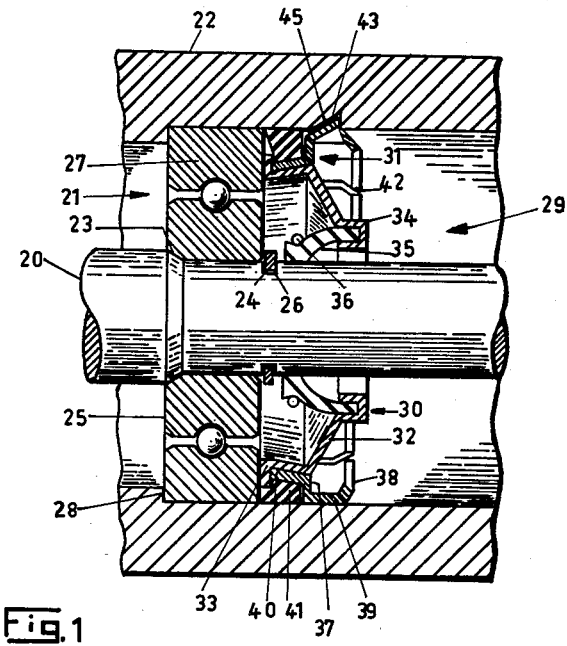
FIG. 1 is a mid-vertical, sectional side elevation of a shaft sealing unit, incorporating this invention.

Referring to FIG. 1, a shaft 20 is rotationally supported by a bearing assembly 21 and is in axial alignment with the cylindrical bore of a bearing housing 22. An inner race 25, a component of bearing assembly 21, abuts a shoulder 23 on shaft 20 and is held in abutment by a locking ring 24 located in a circumferential groove 26 in shaft 20 and radially projecting therefrom. The projecting portion of locking ring 24 is in face to face contact with the opposite face of inner race 25 to that abutting shoulder 23.

For the purposes of this description, the face of inner race 25 in contact with shoulder 23 will be known as the front face, that against locking ring 24 will be known as the rear face. Other directional references will be relative to this.

An outer race 27, a component of bearing assembly 21 is in radial alignment with inner race 25, and is press fit in the bore of bearing housing 22. A shoulder 28 is formed in the bore of bearing housing 22, its rear face abutting the front face of outer race 27.

A seal unit, indicated generally by arrow 29, comprising an inner component 30 and an outer component 31 is located immediately to the rear of bearing assembly 21.

Inner component 30 of seal unit 29 comprises a substantially bell-shaped housing 32, the mouth of the bell extending radially outwardly to form a flange 33, the front face of which is in contact with the rear face of outer race 27. From flange 33, housing 32 extends firstly rearwardly and outwardly and subsequently rearwardly and inwardly to terminate in an annular collar 34, concentric with shaft 20. Collar 34 is of U cross-section, the closed end of which faces rearwardly.

A resilient cylindrical seal 35 having its rear portion secured within collar 34, is in sealable, slideable contact with shaft 20.

A helically coiled circular type spring 36 encircles seal 35 adjacent its front end and applies a pressure radially inwardly, thus holding seal 35 in pressural contact with shaft 20.

Circular outer component 31 of seal unit 29 is of a substantially U cross-section, comprising a front wall 37, a rear wall 38 and an outer wall 39. An extension 40 to front wall 37 slopes forwardly and inwardly in pressural, face-to-face contact with the mating portion of inner housing 32 located immediately to the rear of flange 33. An annular sealing ring 41 of substantially rectangular cross-section is compressed between the rear face of flange 33 of inner housing 32 and the front face of the front wall 37 of the outer seal component 31. In its free state, the diameter of sealing ring 41 is greater than the bore of bearing housing 22. In the diagram, seal 41 is shown in its assembled, distorted shape, its front face extending forwardly and its outer face in full, pressural contact with the bore of housing 22. An even number of slots 42 are formed in outer component 31 extending longitudinally from the rear edge of the rear wall 38 and terminating substantially at the front of the outer wall 39. A raised lip 43 is formed in each alternate portion of outer wall 39, as defined by slots 42, and extends circumferentially for substantially the width thereof, a longitudinal section of lip 43 being wedge shaped, the thin end towards the front.

A plurality of coplanar, circumferential recesses 45 are formed in the bore of housing 22, the number corresponding to the number of lips 43 formed in the outer component 31. Recesses 45 are of similar wedge-shape section, and are complementary to lips 43, being so located that lips 43, due to the resiliency of the material, may be aligned with, and spring into, them upon seal unit 29 being assembled to shaft 20 and bearing assembly 21, and with outer race 27 hard against shoulder 28.

Figure 2:
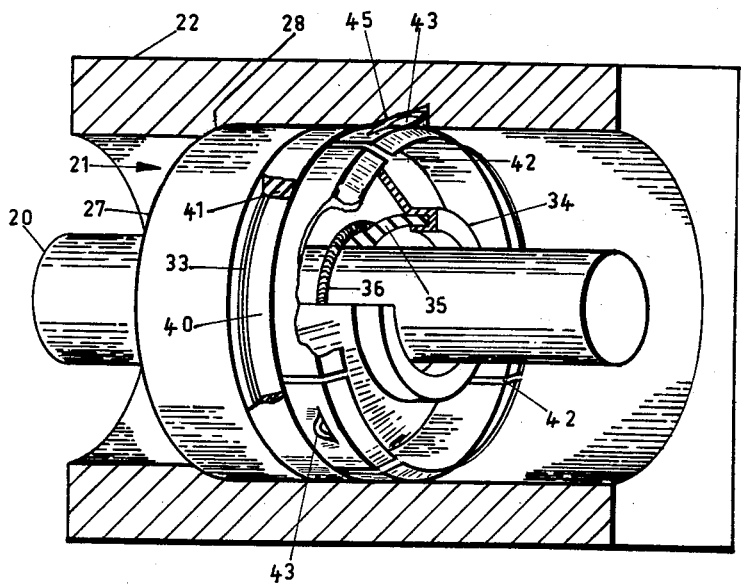
FIG. 2 is a part-sectional, perspective view showing the shaft sealing unit in its operative position within the shaft bearing housing.

Referring to FIG. 2, the general arrangement of the components illustrated in FIG. 1, may be seen in perspective. Shaft 20, supported by bearing 21, is shown assembled in housing 22. Outer bearing 27 is hard forward against shoulder 28 and seal 41 is shown in cut-away section to reveal flange 33 of inner component 30 and the extension 40 of outer component 31. Slots 42 are clearly illustrated, dividing the rear portions of outer component 31 into an even number of like parts. The general configuration of lips 43 is shown, both in plan perspective and side view, the latter also illustrates the positioning of lips 43 in recesses 45. To the rear of the assembly, collar 34 is cut away to reveal seal 35 around shaft 20 and spring 36 assisting to maintain pressure between seal 35 and shaft 20.

Referring to FIG. 3, viewed from the rear the shaft sealing unit as described in FIGS. 1 and 2 presents a series of concentric components. From shaft 20 outwardly, the gap between shaft 20 and collar 34 of the inner component 30 is taken up by seal 35. The interior of outer component 31 is shown and the extent of its rear wall 38 indicated. Slots 42 are shown extending radially outwardly in wall 38, and in dotted detail, lips 43 on alternate sections of the slotted outer wall 39 are shown in the recesses 45 in bearing housing 22.

Figure 5:
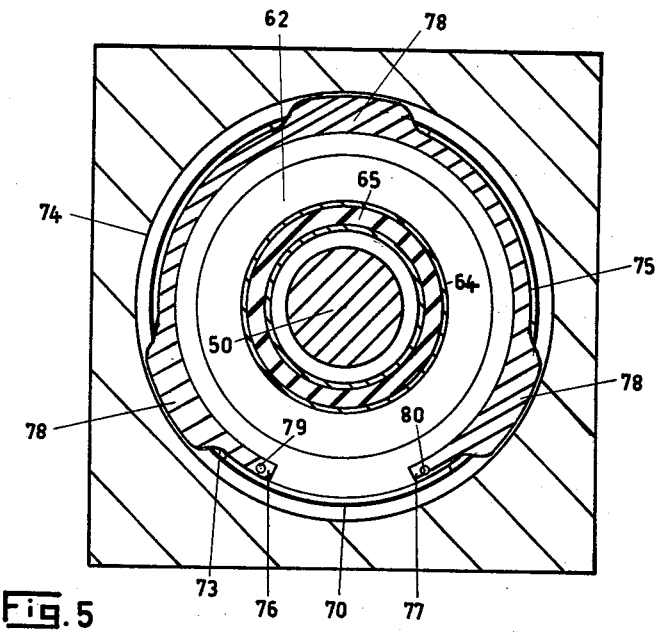
FIG. 5 is a sectional end elevation taken on, and viewed in the direction of, arrows 5—5 in FIG. 4, illustrating particularly the alternative method of locking the unit in the shaft bearing housing.
Figure 6:
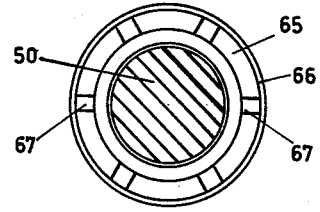
FIG. 6 is a sectional end elevation taken on, and viewed in the direction of, arrows 6—6 in FIG. 4, illustrating particularly the alternative method of applying pressure to the shaft seal.

Referring to FIGS. 4, 5 and 6, the illustrated shaft sealing unit is similar to the unit illustrated in FIGS. 1, 2 and 3 with the exception of the method of applying pressure to the seal around the shaft and of locking the unit in the bearing housing.

Referring to FIGS. 4, 5 and 6 shaft 50 is rotatably supported by bearing assembly 51 contained within bearing housing 52. A shoulder 53 formed on shaft 50 abuts inner race 54 of bearing assembly 51, and spring locking ring 55 located in circumferential groove 56 in shaft 50 abuts the opposite face of inner race 54. Inner race 54 is thus located axially on shaft 50.

For the purposes of this description, the face of inner race 54 in contact with shoulder 53 will be known as the front face, while that in contact with locking ring 55 will be known as the rear face. Other directional references will be relative to this.

An outer race 57 of bearing assembly 51 is a press fit in the bore of bearing housing 52. A shoulder 58, formed in the bore of bearing housing 52, is in contact with the front face of outer race 57, limiting the forward travel of bearing assembly 51 in bearing housing 52.

A seal unit, indicated generally by an arrow 59, comprising an inner component 60 and an outer component 61 is located immediately to the rear of bearing assembly 51.

Inner component 60 of seal unit 59 comprises a substantially bell-shaped housing 62, the mouth of the bell extending radially outwardly to form flange 63, the front face of which is in contact with the rear face of outer race 57. From flange 63, housing 62 extends firstly rearwardly and outwardly and subsequently rearwardly and inwardly and terminates in cylindrical collar 64 concentric with shaft 50. Collar 64 is of U section, the closed end facing rearwardly and the open end located within housing 62.

A resilient, cylindrical seal 65 having its rear portion secured within collar 64, is in sealable, slideable contact with shaft 50. A spring ring 66, having a plurality of forwardly and inwardly extending fingers 67 is located on the periphery of seal 65 forward of collar 64, fingers 67 applying an inward pressure to the forward portion of seal 65, causing seal 65 to maintain pressural contact with shaft 50.

The outer component 61 of seal unit 59 is substantially U section, comprising front wall 68, rear wall 69 and outer wall 70. A conical extension 71 to front wall 68 slopes forwardly and inwardly in pressural, face-to-face contact with the mating portion of inner housing 62 located immediately to the rear of flange 63.

An annular sealing ring 72 of substantially rectangular cross-section is retained between the front face of front wall 68 of outer component 61 and the rear face of flange 63 of inner component 60. In its free state, the outside diameter of sealing ring 72 is greater than the bore of bearing housing 52. As illustrated in FIG. 4, seal ring 72, upon assembly within the bore of bearing housing 52, is distorted, the front face extending forwardly and the outer face being in full, pressural contact with the bore of bearing housing 52.

A plurality of circumferential, coplanar slots 73, are formed in outer wall 70, of outer component 61. A circumferential groove 74, having substantially straight sides, is formed in the bore of bearing housing 52. Upon bearing assembly 51 being fully installed in bearing housing 52 and flange 63 being hard against outer race 57 and the front face of outer race 57 simultaneously abutting shoulder 58, groove 74 is in axial alignment with slots 73.

An open ended spring locking ring 75 comprises two ends 76 and 77 in spaced-apart relationship and a plurality of lugs 78, numerically equal to the number of slots 73 in outer component 61, extending radially outwardly. Lugs 78 are adapted to freely pass through slots 73 in outer component 61 and fit into groove 74 in bearing housing 52. The overall face diameter of ring 75 is greater than that of groove 74; the overall compressed diameter of ring 75, upon ends 76 and 77 being brought into abutment, is smaller than the maximum external diameter of outer component 61. Two holes 79 and 80 are formed in the ends 76 and 77 respectively of locking ring 75 to facilitate the use of special pliers, (not illustrated), adapted for the compression of spring locking rings and the like.

Figure 7:
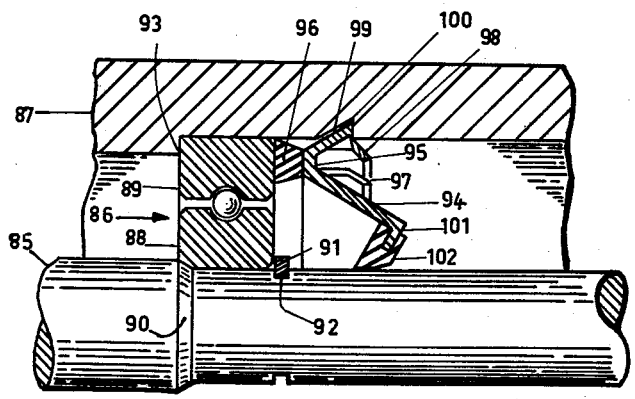
FIG. 7 is a fractional, mid-vertical, sectional side elevation of a shaft sealing unit, illustrating an alternative method of attaching the seal elements to a seal retainer.

Referring to FIG. 7, shaft 85 is supported by bearing assembly 86 within the bore of bearing housing 87. Bearing assembly 86 comprises inner race 88 and outer race 89, inner race 88 being a press fit on shaft 85 and outer race 89 being a slide fit in the bore of housing 87. A shoulder 90 on shaft 85 prevents the travel of inner race 88 in one direction. A spring ring 91, located in groove 92, abuts inner race 88 and prevents travel of inner race 88 away from shoulder 90.

In the following the face of inner race 88 abutting shoulder 90 will be known as the front face, that abutting spring ring 91, the rear face. All other directional references will be relative to this.

A shoulder 93 formed in the bore of bearing housing 87 is contiguous to the front face of outer race 89 of bearing assembly 86.

A circular seal unit 94 of substantially S-section is located rearwardly of bearing assembly 86. A flattened front face 95 of seal unit 94 carries circular resilient seal 96 of isosceles trapezoidal section, having the longer parallel side in face-to-face compressive contact with the rear face of outer race 89 of bearing assembly 86, and having the outer periphery of seal 96 in compressive contact with the bore of housing 87. A number of slots 97 are formed in the periphery of seal unit 94, extending forwardly from the rear edge, forming a number of sections 98. Each section 98 of seal unit 94 bears outwardly raised lip 99 of wedge configuration, the thin end of the wedge pointing forwardly. Viewed from the rear, lips 99 are of semi-elliptical section.

A plurality of recesses 100, equal in number and spacing and similar in size and configuration to lips 99 are formed in bearing housing 87, their positioning being so adapted that upon assembly of lips 99, within recesses 100, seal 96 is compressed against the rear face of outer race 89, and bore of housing 87.

The inner portion 101 of seal unit 94 is in spaced relationship and concentric to shaft 85, and is of truncated conical configuration, extending forwardly and inwardly, and carries resilient shaft seal 102 which is in pressural contact with shaft 85.

Figure 8:
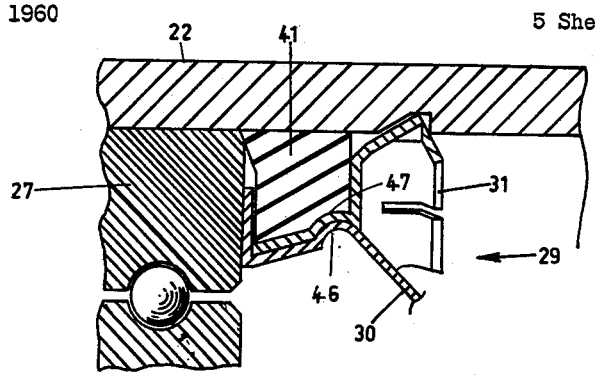
FIG. 8 is a fractional, mid-vertical, sectional side elevation of shaft sealing unit, illustrating an alternative means of positively interlockng two seal retainer units embodied in one form of the invention as illustrated in FIGS. 1 and 2.

Referring to FIG. 8, shaft sealing unit 29 as described in FIG. 1 is improved to the extent that inner component 30 and outer component 31 are positively interlocked by means of one or more local, matching indentations 46 and 47 in components 30 and 31 respectively.

Figures 9, 10:
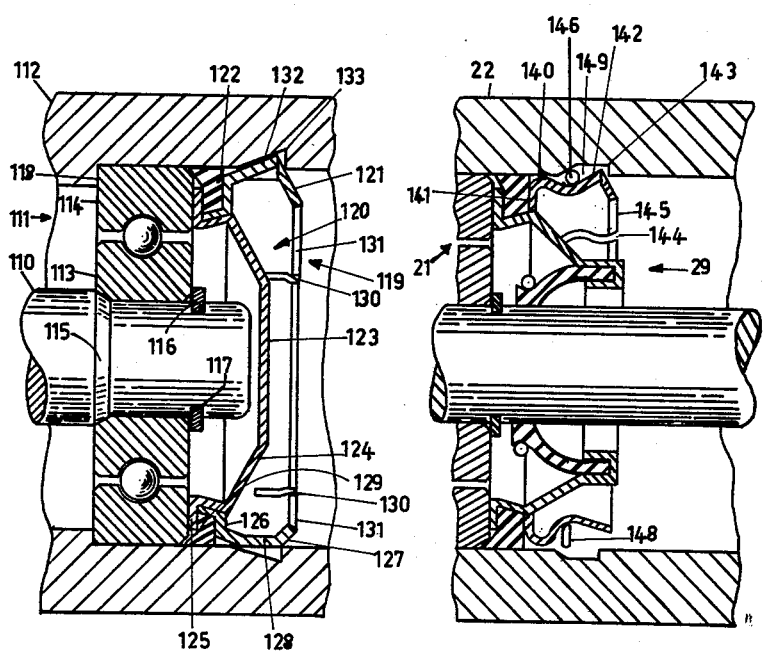
FIG. 9 is a mid-vertical, sectional side elevation of a shaft sealing unit adapted to be utilized as a diaphragm-type seal, shown sealing the aperture of the shaft bearing housing where the shaft projects only a short distance through the bearing.
FIG. 10 is a mid-vertical, sectional side elevation of a shaft sealing unit illustrating another alternative method of locking the unit in the shaft bearing housing.

Referring to FIG. 9, the illustrated shaft sealing unit comprises shaft 110 rotatably supported by bearing assembly 111 located in bearing housing 112. Bearing assembly 111 comprises inner race 113 and outer race 114. Inner race 113 is a press fit on shaft 110, outer race 114 is a slide fit in the bore of housing 112. A shoulder 115 on shaft 110 locates inner race 113 in one direction. A spring ring 116, adapted to fit in and protrude from groove 117 formed in shaft 110, locates inner race 113 in the opposite direction.

In the following the face of inner race 113 abutting shoulder 115 is known as the front face, that abutting spring ring 116 the rear face. All other directional references are relative to this.

A shoulder 118, formed in housing 112, abuts the front face of outer race 114 and is adapted to be utilized as a stop for bearing assembly 111.

Shaft 110 terminates adjacent to the rear of groove 117.

A seal unit 119 comprising inner component 120, outer component 121, and seal 122, is fitted within the bore of bearing housing 112. Inner component 120 is dish shaped, having disc-like end portion 123, from the perimeter of which side wall 124 extends forwardly and outwardly and subsequently, forwardly and inwardly, terminating in outwardly radial flange 125. Flange 125 abuts the rear face of outer race 114.

Outer component 121 of seal unit 119 is substantially identical to outer component 31 of seal unit 29 as illustrated in FIGS. 1, 2 and 3 and comprises front wall 126, rear wall 127 and outer wall 128. A forward conical extension 129 of front wall 126 is located in concentric, pressural contact with the forward portion of side wall 124, of inner component 120. Seal 122 is retainably held between the rear face of flange 125 and the front face of front wall 126, and is in a compressed condition upon being installed. Slots 130 divide rear wall 127 and outer wall 128 into a number of sections 131 and lip 132 is raised on section 131 identical to lips 43 in FIGS. 1, 2 and 3. A mating recess 133 for each lips 132 is formed in the bore of bearing housing 112.

Upon seal unit 119 being assembled within the bore of bearing housing 112, the recesses 133 are so positioned that with lips 132 positioned within recesses 133, flange 125 holds outer race 114 firmly against shoulder 118 thus positively locating bearing assembly 111 within bearing housing 112.

Referring to FIGS. 10 and 11, another alternative method is illustrated of retaining seal unit 29, as shown in FIGS. 1 and 3, within the bore of bearing housing 22. Outer component 31 is replaced by modified outer component 140 comprising front wall 141 and outer wall 142. Outer wall 142 is of a V-section, the tail 143 of the V, i.e., the rear edge of outer wall 142, extends rearwardly and outwardly to an outer diameter greater than the bore of bearing housing 22. A plurality of slots 144 extend forwardly from the rear edge of outer wall 142 terminating adjacent and to the rear of front wall 141, thus dividing outer wall 142 into a plurality of sections 145. One of sections 145 is removed to allow for the operation of open ended wire ring 146 adapted to be retained in the crotch of the V-section of outer wall 142. Two smaller ringlike ends 147 and 148 of ring 146 lie in spaced apart relationship within the space provided by the removal of one of sections 145. Recesses 45, as shown in FIGS. 1 and 3, are replaced by continuous groove 149. The seal unit 29, and consequently, bearing assembly 21, is retained in bearing housing 22 by sections 145 springing outwardly into groove 149. In order to remove seal unit 29, ends 147 and 148 of ring 146 are brought together by pliers (not shown), causing section 145 to emerge from groove 149 and thus release seal unit 29 from its locked position.

Similarly, FIGS. 12 and 13 illustrate another method of retaining seal unit 29, as shown in FIGS. 1 and 3, within the bore of bearing housing 22. Outer component 31 is replaced by modified component 150, having vertical front wall 151, outer wall 152 sloping outwardly and rearwardly, and vertical rear wall 153. Walls 153 and 152 carry a plurality of slots 154 which extend from the edge of rear wall 153 to the rear of front wall 151, forming a plurality of sections 155 which spring outwardly and have a free diameter greater than the bore of bearing housing 22. A short, circumferential slot 156 is centrally located in each rear wall 153 of each section 155. Recesses 45 as shown in FIGS. 1 and 3 are replaced by continuous groove 157. Seal unit 29 is now retained within bearing housing 22 by sections 155 springing outwardly into groove 157. Removal of seal unit 29 from housing 22 is facilitated by the use of pliers (not shown) adapted to fit into slots 156, causing sections 155 to move radially inwardly until free of groove 157.

The embodiment of this invention in which an exclusive property or privilege is claimed are defined as follows:

1. A shaft sealing unit for location within the bore of a bearing housing somprising sealing means and a housing for said sealing means; said housing including an inner component and an outer component; said inner component beig tubular and substantially bell-shaped; a flange extending radially outwardly of a wider diameter open end of said inner component and a shaft seal supported by a smaller diameter open end of said inner component; said outer component being locked in concentric contiguity with said inner component and, in cooperation with said flange, adapted to support a bore seal; a plurality of arcuately, flexible resilient retaining members projecting outwardly from said outer component, said plurality of retaining members being adapted to permit forcible flexing thereof radially inwardly to a total major diameter of said members of a size less than the diameter of said bore, said retaining members upon being released of said flexing force, being biased radially outwards to a total major diameter of said members, of a size larger than the diameter of said bore, said bore containing annularly disposed groove means adapted to receive and retain radial extremity portions of said retaining members; said flange being cooperable with said bearing housing upon said retaining members entering said groove; and means for manually flexing said retaining members inwardly to facilitate the removal of said sealing unit from said bore.

2. A shaft sealing unit as claimed in claim 1 in which said annularly disposed groove means comprise one unbroken annular groove.

3. A shaft sealing unit as claimed in claim 1 in which said annularly located groove means comprise a plurality of independent internal slots, equal in number to quantity of said retaining members.

4. A shaft sealing unit as claimed in claim 1 in which said forcible flexing of said plurality of retaining members is effectuated by split spring ring means contractibly located circumferentially and externally of said plurality of retaining members, two free ends of said spring means terminating in eye means.

5. A shaft sealing unit as claimed in claim 1 in which said retaining members contain retracting slots adapted to receive retracting pliers adapted to bias said plurality of retaining members simultaneously radially inwards.

6. A shaft sealing unit as claimed in claim 1 in which said plurality of retaining members comprises radially extending lugs situated on compressible expanding, outwardly biased, ring means.

7. A shaft sealing unit as claimed in claim 1 in which said retaining members comprise split spring ring means, said spring ring means being, in free state, of a configuration deformed from a circular configuration to provide a plurality of outwardly biased spring ring portions.

8. A shaft sealing unit as claimed in claim 1 in which said plurality of retaining members comprises rigid, radially outward disposed indentations located in flexible portions of outer circumferential wall of said sealing unit.

References Cited in the file of this patent
UNITED STATES PATENTS

| | | |
|---|---|---|
| 2,699,345 | Bales | Jan. 11, 1955 |
| 2,834,616 | Gebert et al. | May 13, 1958 |
| 2,926,938 | Ratti | Mar. 1, 1960 |